United States Patent
Schleker et al.

(10) Patent No.: US 8,028,998 B2
(45) Date of Patent: Oct. 4, 2011

(54) RADIAL SEAL

(75) Inventors: Martin Schleker, Bremelau (DE); Klaus Bendl, Oberderdingen (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 11/366,326

(22) Filed: Mar. 2, 2006

(65) Prior Publication Data

US 2007/0170656 A1    Jul. 26, 2007

(30) Foreign Application Priority Data

Jan. 24, 2006  (DE) .......................... 10 2006 003 194

(51) Int. Cl.
F16J 15/02 (2006.01)
(52) U.S. Cl. ........................................ 277/551; 277/577
(58) Field of Classification Search .................. 277/551, 277/553, 554, 572, 573, 576, 577
See application file for complete search history.

(56) References Cited

U.S. PATENT DOCUMENTS

| | | | | |
|---|---|---|---|---|
| 2,958,551 A * | 11/1960 | Rogers | ........................ | 384/148 |
| RE24,940 E * | 2/1961 | Stephens | ........................ | 277/402 |
| 3,127,185 A * | 3/1964 | Evans | ........................ | 277/553 |
| 3,353,666 A * | 11/1967 | Jensen | ........................ | 206/447 |
| 3,727,923 A * | 4/1973 | McEwen | ........................ | 277/551 |
| 4,274,641 A * | 6/1981 | Cather, Jr. | ........................ | 277/309 |
| 4,530,506 A * | 7/1985 | Weiler et al. | ........................ | 277/636 |
| 4,537,289 A * | 8/1985 | VonGrunberg et al. | ....... | 188/72.4 |
| 4,579,352 A * | 4/1986 | Adang | ........................ | 277/573 |
| 4,588,195 A * | 5/1986 | Antonini et al. | ............... | 277/504 |
| 5,656,693 A * | 8/1997 | Ellul et al. | ...................... | 525/171 |
| 6,719,293 B1 * | 4/2004 | Coles et al. | .................... | 277/312 |
| 7,500,459 B2 * | 3/2009 | Koji | .......................... | 123/195 C |
| 2005/0173869 A1 | 8/2005 | Wagner | ........................ | 277/602 |
| 2006/0220323 A1 * | 10/2006 | Frostick et al. | ............... | 277/500 |

FOREIGN PATENT DOCUMENTS

| | | |
|---|---|---|
| DE | 699 28 612 T2 | 8/2006 |
| DE | 11 2006 000 246 T5 | 6/2008 |
| EP | 0 980 982 A | 2/2000 |
| EP | 0 980 982 B1 | 2/2000 |
| JP | 62-195643 | 12/1987 |
| JP | 2003-269616 A | 9/2003 |
| WO | 95/09998 A | 4/1995 |
| WO | 2006/033197 A | 3/2006 |

* cited by examiner

Primary Examiner — Vishal Patel

(57) ABSTRACT

In order to provide a radial seal for sealing between a first component arranged radially inside the radial seal and a second component arranged radially outside the seal, which is suitable for sealing between two components, of which at least one has a non-rotationally symmetrical contact face for the radial seal, it is proposed that the radial seal comprises a non-rotationally symmetrical sealing body with an inner sealing face for application to the first component and an outer sealing face for application to the second component, a first reinforcement element, which supports the inner sealing face against a pressing force acting radially outwardly and a second reinforcement element, which supports the outer sealing face against a pressing force acting radially inwardly.

16 Claims, 6 Drawing Sheets

RADIAL SEAL

The present invention relates to the subject, which has been disclosed in the German patent application No. 10 2006 003 194.6 dated 24 Jan. 2006. The entire description of this earlier application is made part of the present description by reference ("incorporation by reference").

The present invention relates to a radial seal for sealing between a first component arranged radially inside the radial seal and a second component arranged radially outside the radial seal.

Radial seals of this type can be used, in particular, when an axial design of the seal is not possible owing to the inadequate rigidity of one of the two components to be sealed with respect to one another.

The present invention is based on the object of providing a radial seal of the type mentioned at the outset, which is suitable for sealing between two components, of which at least one has a non-rotationally symmetrical contact face for the radial seal.

This object is achieved according to the invention by a radial seal according to claim 1, which comprises a non-rotationally symmetrical sealing body with an inner sealing face for application to the first component and an outer sealing face for application to the second component, a first reinforcement element, which supports the inner sealing face against a pressing force acting radially outwardly, and a second reinforcement element which supports the outer sealing face against a pressing force acting radially inwardly.

The radial seal according to the invention makes it possible to seal components, which owing to their function, have a contact face for the seal, which is not rotationally symmetrical, by a shape-linked seal adapted to the non-rotationally symmetrical shape of this contact face.

Until now, it was only possible to seal a non-rotationally symmetrical shape of this type, in particular an oval shape by means of an axial seal; an axial design of this type of the seal may not, however, always be implemented, in particular in the case of inadequate rigidity of one of the components to be sealed.

The radial seal according to the invention makes a reliable, shape-linked double radial seal possible at the first component arranged inside the radial seal and also at the second component arranged radially outside the radial seal, even with low rigidity of one or both components to be sealed.

Furthermore, the radial seal according to the invention allows misalignment tolerances between the two components to be sealed to be amply compensated both in the radial and in the axial direction.

The ratio of the length of the sealing body to the width of the sealing body is at least 1.2:1, preferably at least 1.5:1 in a preferred configuration of the radial seal according to the invention.

In this case, the length of the sealing body is taken to mean the largest extent of the sealing body perpendicularly to the seal axis and the width of the sealing body is taken to mean the smallest extent of the sealing body perpendicularly to the seal axis.

Basically, the sealing body of the radial seal according to the invention can be adapted to any desired, non-rotationally symmetrical shape of the contact face of the first component and/or of the second component.

In a preferred configuration of the invention, it is provided that the sealing body has a substantially oval shape in plan view.

Basically, it could be provided that the first reinforcement element and/or the second reinforcement element extend only partially, i.e. over an angle range of less than 360°, around the sealing axis of the radial seal.

Specially good dimensional stability of the radial seal is achieved, however, when the first reinforcement element and/or the second reinforcement element are configured so as to be annularly closed.

In order to achieve a good seal with respect to the first component arranged radially inside the radial seal, it is preferably provided that the first reinforcement element and/or the second reinforcement element have a shape adapted to the form of a peripheral face of the first component.

To achieve a good seal on the second component arranged radially outside the radial seal, it may also be provided that the first reinforcement element and/or the second reinforcement element have a shape adapted to the form of a contact face of the second component.

The first reinforcement element and/or the second reinforcement element may be at least partially embedded in the sealing body. This offers the advantage that the radial seal can be easily handled as a unit which has already been completed during production of the sealing body.

As an alternative, or in addition to this, it may also be provided that the first reinforcement element and/or the second reinforcement element rest at least partially on an outer face of the sealing body. A reinforcement element of this type resting on an outer face of the sealing body can be displaced relative to the sealing body, which may make compensation of larger misalignment tolerances possible.

In order to achieve adequate reinforcement of the sealing body, it is advantageously provided that the first reinforcement element and/or the second reinforcement element are formed from a metallic material, for example from an aluminium alloy or a steel material.

The first reinforcement element and the second reinforcement element are preferably arranged offset with respect to one another in the axial direction of the radial seal.

In order to be able to compensate misalignment tolerances particularly well between the components to be sealed, it is favourable if the first reinforcement element and the second reinforcement element are movable relative to one another in the axial direction and/or in the radial direction of the radial seal.

The first reinforcement element and/or the second reinforcement element may have at least one portion oriented substantially in the axial direction.

As an alternative or in addition to this, the first reinforcement element and/or the second reinforcement element may have at least one portion oriented substantially in the radial direction of the radial seal.

The sealing body of the radial seal is preferably formed from an, in particular elastomeric, plastics material.

For example, it may be provided that the sealing body is formed from an ethylene-acrylate rubber (AEM) or from a fluoro-rubber (FPM).

In order to be able to compensate particularly large misalignment tolerances between the components to be sealed in the radial direction and/or in the axial direction, it may be provided that the sealing body comprises a compensation region, which can be deformed in the radial direction and/or in the axial direction of the sealing body.

A compensation region of this type may have, in particular, a substantially U-shaped cross-section.

The radial seal according to the invention is suitable, in particular, for sealing between a transmission housing cover and a plug unit guided through a through-aperture of the cover.

Further features and advantages of the invention are the subject of the following description and the view of embodiments in the drawings.

In the drawings.

The same or functionally equivalent elements are designated by the same reference numerals in all the figures.

Figure 1:
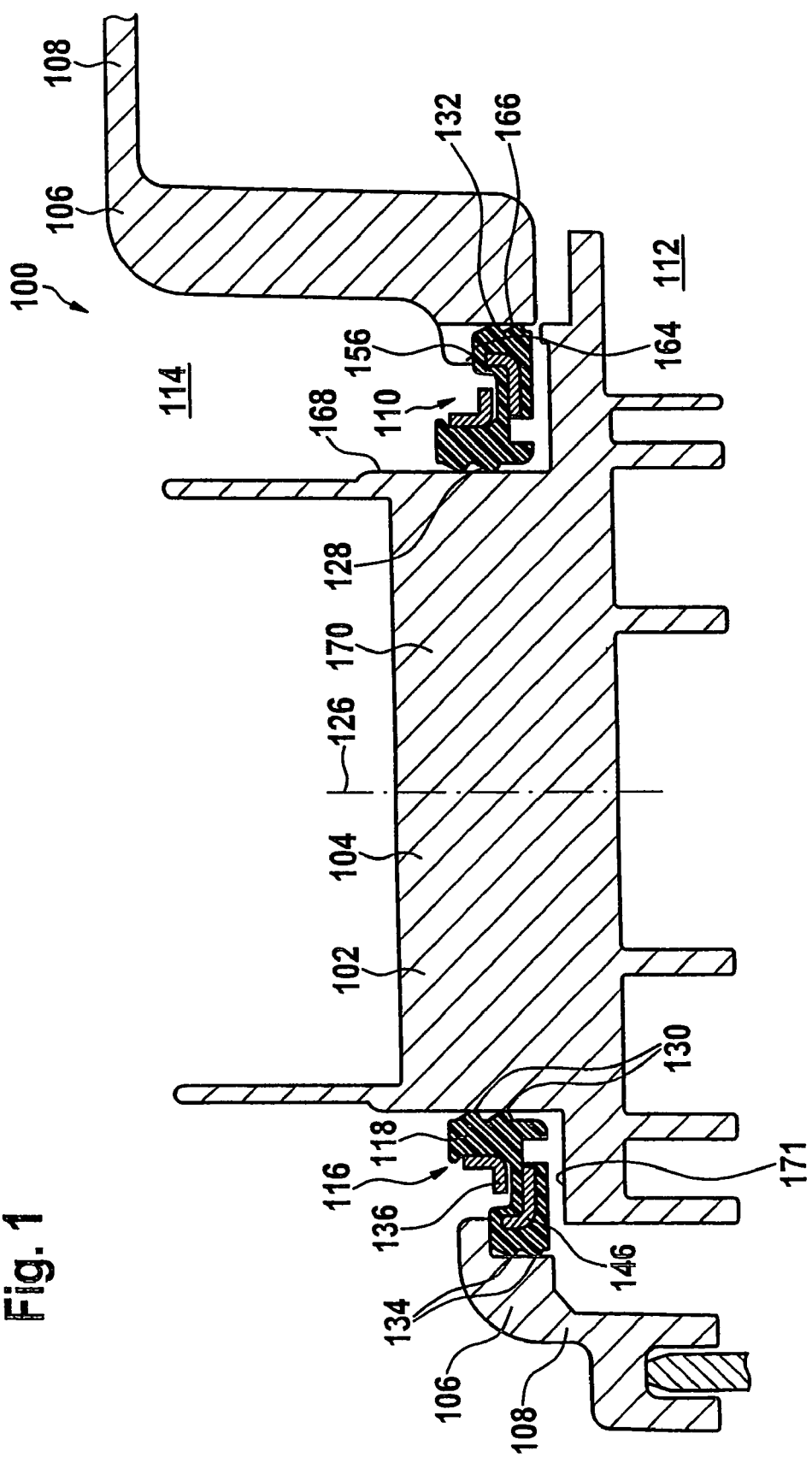
FIG. 1 shows a schematic vertical section through a housing cover and a plug unit extending through a through-aperture of the housing cover, the plug unit and the housing cover being sealed with respect to one another by means of a radial seal.
Figure 2:
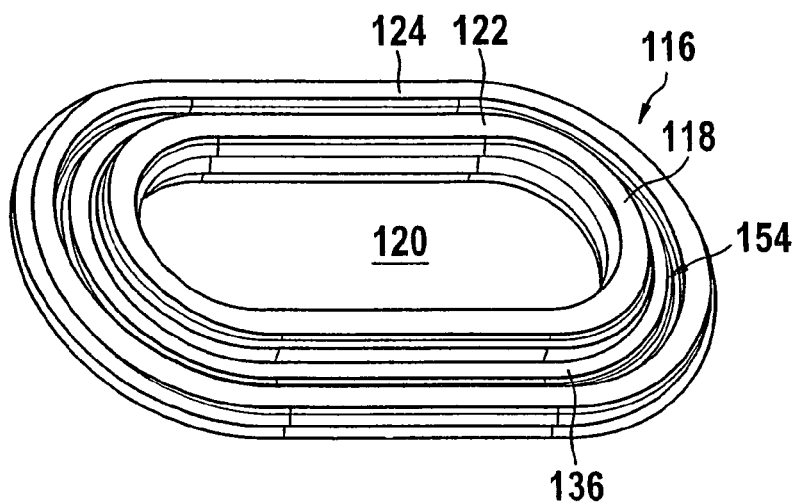
FIG. 2 shows a schematic perspective view of the radial seal from FIG. 1.

An assembly designated as a whole by 100, shown in FIG. 1, comprises a first component 102 in the form of a plug unit 104 and a second component 106 in the form of a housing cover 108, for example a cover for a transmission housing, the plug unit 104 extending through an oval through-aperture 110 provided on the housing cover 108 from an inner space 112 of the housing cover 108 to an outer space 114 of the housing cover 108.

In order to seal the inner space 112 with respect to the outer space 114, a radial seal 116 is arranged between the plug unit 104 and the housing cover 108 and is shown in detail in FIGS. 2 to 6.

The radial seal 116 comprises a non-rotationally symmetrical, in particular oval, sealing body 118, which is adapted to the oval shape of the through-aperture 110 in the housing cover 108, is configured to be annularly closed and extends around a central through-aperture 120 of the radial seal 116.

The ratio of the length L of the sealing body 118 to its width B is, for example, about 5:3.

Figure 4:
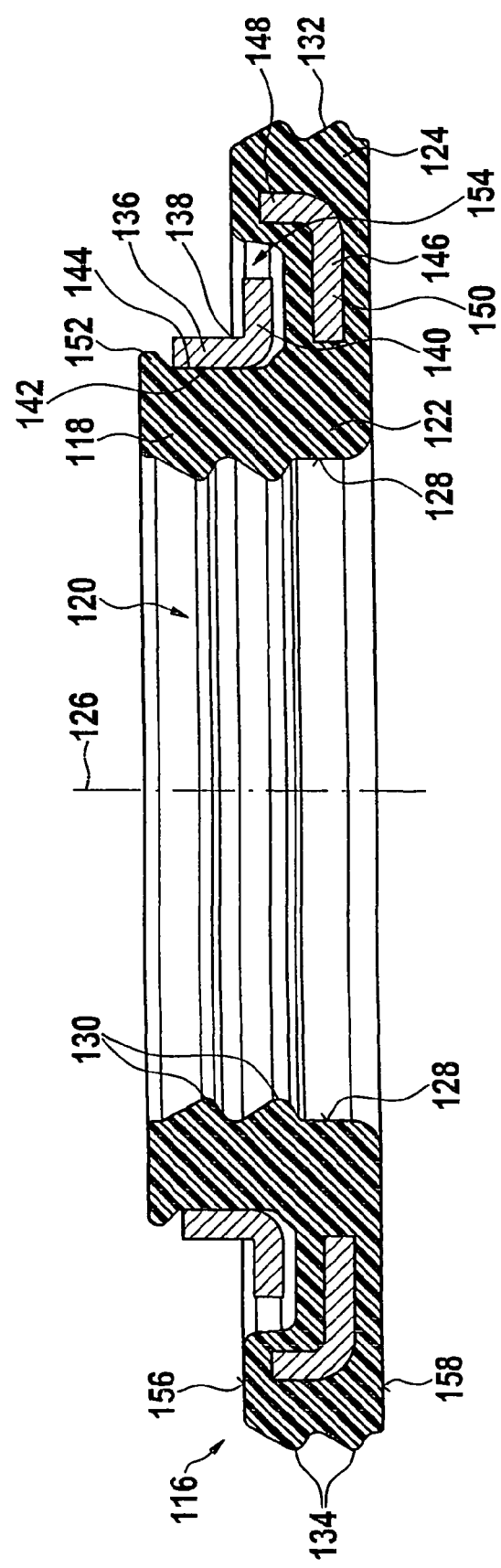
FIG. 4 shows a schematic cross-section through the radial seal along the line 4-4 in FIG. 3.
Figure 5:
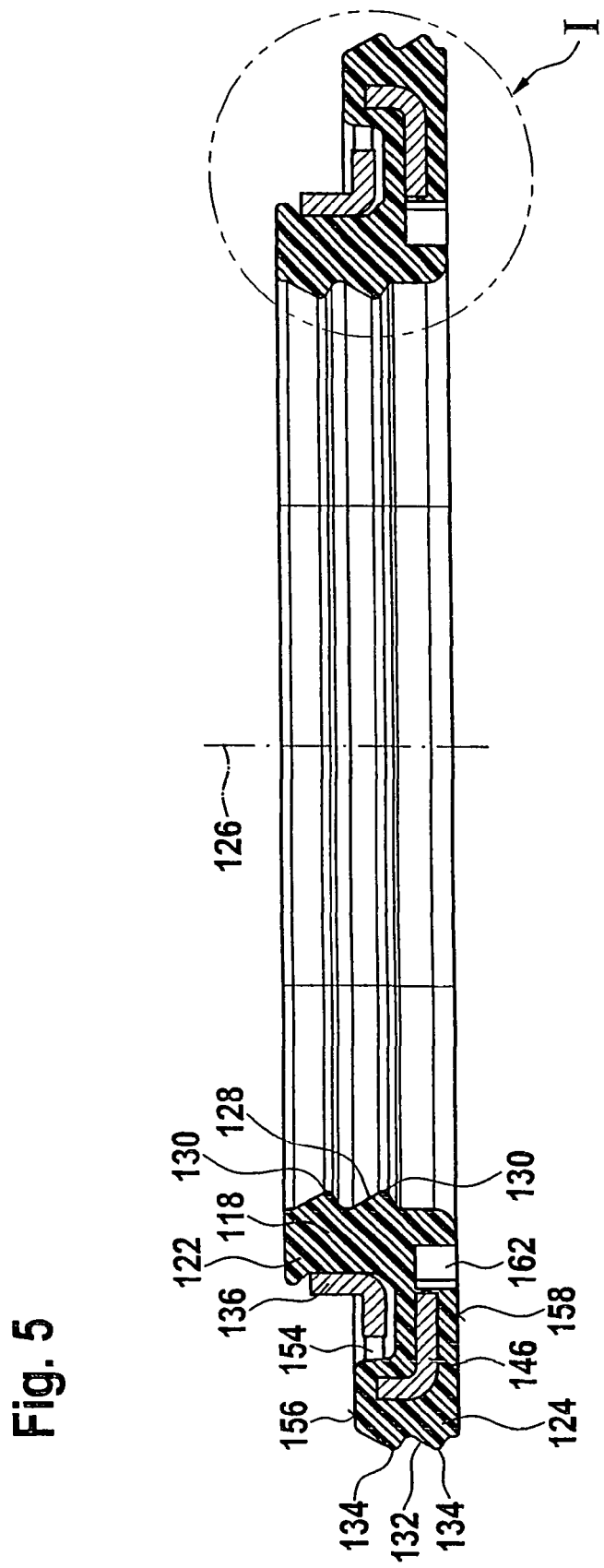
FIG. 5 shows a schematic longitudinal section through the radial seal along the line 5-5 in FIG. 3.
Figure 6:
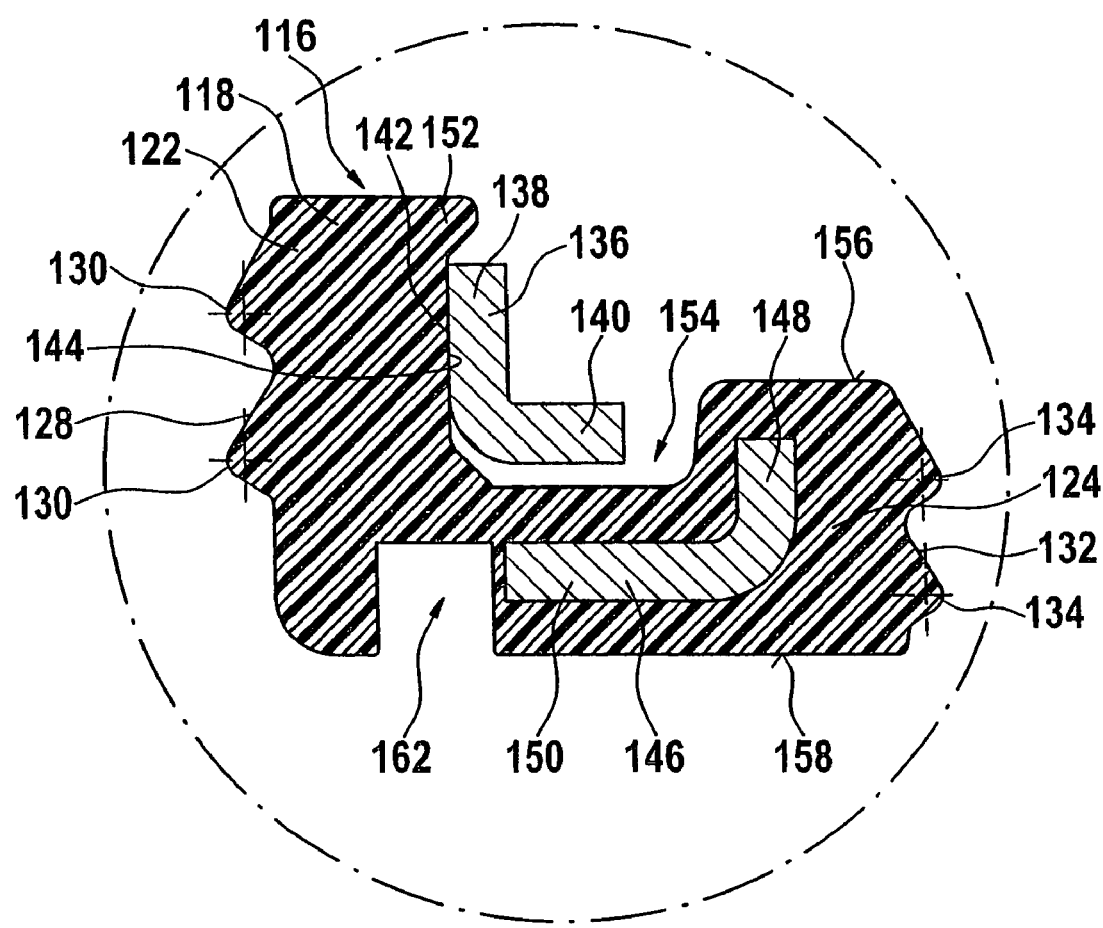
FIG. 6 shows an enlarged view of the region I from FIG. 5.

As can be seen from FIGS. 4 to 6, the sealing body 118 has an inner portion 122, located radially inside, with a substantially I-shaped cross-section and a radially outer portion 124, located radially outside, with a substantially L-shaped cross-section.

The inner peripheral face of the inner portion 122 of the sealing body 118, which is directed radially inwardly, i.e. to the ring axis 126 of the radial seal 116, forms an inner sealing face 128 of the sealing body 118, which is provided with a plurality of, for example with two, sealing lips 130 extending in an annularly closed manner around the inner sealing face 128.

The outer peripheral face of the outer section 124 of the sealing body 118, which is directed radially outwardly, i.e. away from the ring axis 126 of the radial seal 116, forms an outer sealing face 132, which is also provided with a plurality of, for example with two, sealing lips 134 extending around the outer sealing face 132 in an annularly closed manner.

The inner portion 122 and the outer portion 124 of the sealing body 118 are configured in one piece with one another.

Moreover, the radial seal 116 comprises a first reinforcement element 136, which is configured in an annularly closed manner and has a non-rotationally symmetrical, in particular oval, shape adapted to the outer peripheral face of the plug unit 104 that is oval in cross-section.

As can be seen from the sectional views of FIGS. 4 to 6, the first reinforcement element 136 has an angular cross-section with an axial leg 138 and a radial leg 140 extending radially outwardly from one end of the axial leg 138.

The inner face 142, which is located radially on the inside, of the axial leg 138 rests from the outside on the outer face 144, which is located radially on the outside, of the inner portion 122 of the sealing body 118.

The first reinforcement element 136 is preferably formed from a metallic material, in particular from an aluminium alloy or from a steel material.

In particular, the first reinforcement element can be formed from the aluminium alloy B046.

The radial seal 116 also comprises a second reinforcement element 146, which is embedded in the outer portion 124 of the sealing body 118.

The second reinforcement element 146 is configured so as to be annularly closed and has a non-rotationally symmetrical, in particular oval, shape, which is adapted to the form of the edge of the through-aperture 110 in the housing cover 108.

The second reinforcement element 146 has an angular cross-section, with an axial leg 148 and with a radial leg 150 extending radially inwardly from one end of the axial leg 148.

As can be seen from FIGS. 4 to 6, the axial legs 138 and 148 of the first reinforcement element 136 or of the second reinforcement element 146 are arranged offset with respect to one another both in the axial direction, i.e. in the direction of the ring axis 126 of the radial seal 116 and in the radial direction, i.e. perpendicularly to the ring axis 126 of the radial seal 116.

Moreover, the radial legs 140 and 150 of the first reinforcement element 136 or of the second reinforcement element 146 are also arranged offset with respect to one another in the axial direction of the radial seal 116.

The second reinforcement element 146 is also preferably formed from a metallic material, in particular from an aluminium alloy or from a steel material.

In particular, the second reinforcement element may be formed from the aluminium alloy B046.

The sealing body 118, in which the second reinforcement element 146 is embedded, is preferably formed from an elastomeric plastics material, for example from an ethylene-acrylate rubber (AEM) or from a fluoro-rubber (FBM).

In particular, the sealing body 118 may be formed from the ethylene-acrylate rubber with the designation AEM 6033.

Configured between the outer portion 124 and the inner portion 122 of the sealing body 118 is a recess 154 on the sealing body 118, which recess receives the radial leg 140 and a lower portion of the axial leg 138 of the first reinforcement element 136.

Moreover, configured on the upper end of the inner portion 122 of the sealing body 118, which is remote from this recess 154, is a retaining bead 152, which extends around the upper edge of the outer face 144 of the inner portion 122 of the sealing body 118 and projects radially outwardly, so the first reinforcement element 136 is secured by the retaining bead 152 against sliding off the sealing body 118 in the axial direction and is therefore retained on the sealing body 118.

The lower end face of the sealing body 118 oriented transversely to the ring axis 126 forms a first contact face 158 of the sealing body 118, with which the sealing body 118 can come into contact with the first component 102 in the form of a plug unit 104.

The upper end face of the outer portion 124 of the sealing body 118, which is orientated transversely to the ring axis 126, forms a second contact face 156, with which the sealing body 118 can come into contact with the second component 106 in the form of a housing cover 108.

In order to produce the radial seal 116 described above, the procedure is as follows:

An injection mould, the inner contour of which corresponds to the outer contour of the sealing body 118, is prepared.

The second reinforcement element 146 is arranged in this injection mould in the desired position, the second reinforcement element 146 being held in this position by knobs projecting into the inner space of the injection mould.

The injection mould is then filled with a plastics material which can be injection moulded, whereby the second reinforcement element 146 is embedded in the plastics material, and the plastics material is cured in order to form the sealing body 118.

Finally, the first reinforcement element 136 is pushed in the axial direction over the retaining bead 152 onto the inner portion 122 of the sealing body 118.

Figure 3:
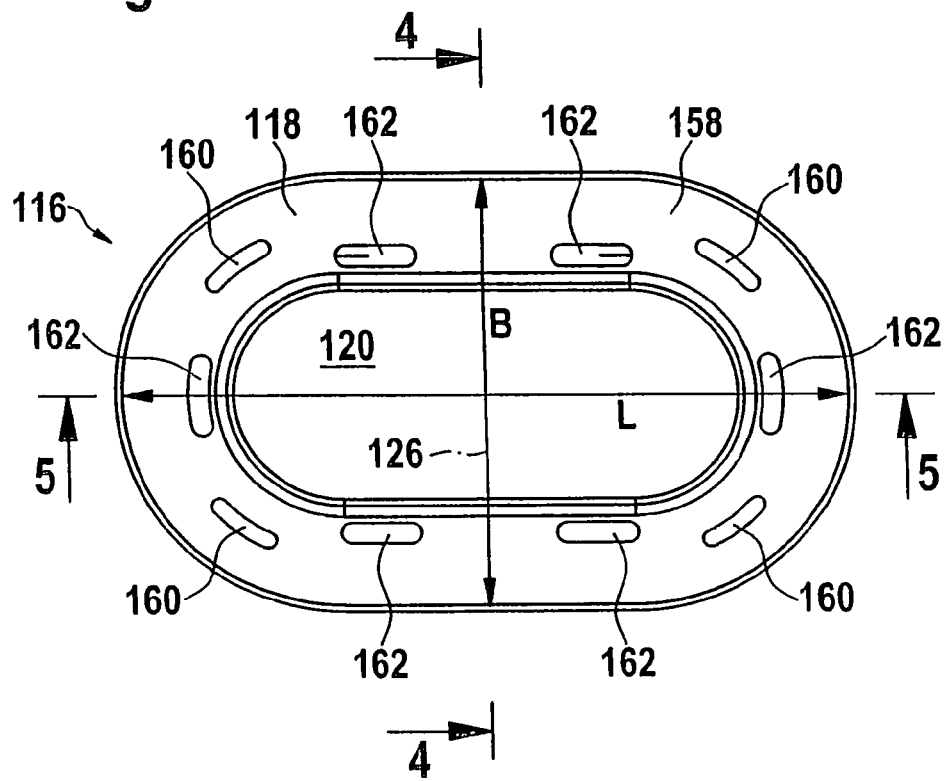
FIG. 3 shows a schematic plan view of the underneath of the radial seal.

Elongate recesses 160 and 162, which are configured in a complementary manner to the shape of the knobs and are configured on the lower end face of the sealing body 118, correspond to the knobs holding the second reinforcement element 146 during injection moulding (see FIG. 3).

These recesses 160, 162 also increase the elastic deformability of the sealing body 118 and therefore the mobility of the inner sealing face 128 and the outer sealing face 132 relative to one another.

When fitting the assembly 100, the radial seal 116 is arranged on the second component 106 of the housing cover 108 in such a way that the second contact face 156 of the sealing body 118 rests on an axial contact face 164 extending around the through-aperture 110 in the housing cover 108 and the outer sealing face 132 of the sealing body 118 rests with the sealing lips 134 on a radial contact face 166 of the housing cover 108.

The first component 102 in the form of the plug unit 104 is then inserted from the inner space 112 of the housing cover 108 into the central through-aperture 120 of the sealing body 118 to such an extent that the inner sealing face 128 of the sealing body 118 rests with the sealing lips 130 on a radial contact face 168 of a contact body 170, which is oval in cross-section, of the plug unit 104.

The first contact face 158 of the sealing body 118, in the fully fitted state, may rest on an axial contact face 171 of the plug unit 104, or else be spaced apart therefrom, as shown in FIG. 1.

In the fully fitted state, the radial seal 116 reliably radially seals the gap between the plug unit 104 and the housing cover 108 by means of the inner sealing face 128 resting with the sealing lips 130 on the radial contact face 168 of the plug unit 104 and by the outer sealing face 132 resting with the sealing lips 134 on the radial contact face 166 of the housing cover 108.

In this case, the inner sealing face 128 is supported by the first reinforcement element 136 against a pressing force acting radially outwardly, exerted by the plug unit 104 on the sealing body 118.

Moreover, the outer sealing face 132 is supported by the second reinforcement element 146 against a pressing force acting radially inwardly, exerted by the housing cover 108 on the sealing body 118.

In this manner, the sealing body 118 retains its non-rotationally symmetrical, in particular oval, shape, which is adapted to the shape of the cross-section of the plug unit 104, so a reliable sealing action is ensured on the inner sealing face 128 and the outer sealing face 132.

Since the sealing body 118 is elastically deformable and the first reinforcement element 136 and the second reinforcement element 146 can be displaced relative to one another, alignment tolerances between the first component 102 and the second component 106 can also be compensated to a large extent both in the radial direction and in the axial direction, i.e. both transversely and also parallel to the ring axis 126.

The form of the sealing body 118 and the reinforcement elements 136, 146 can be adapted, in this case, to the respective shape of the cross-section of the first component 102, in other words, for example of the plug unit 104.

This shape does not absolutely have to be oval, but may adopt any desired non-rotationally symmetrical shape.

Figure 7:
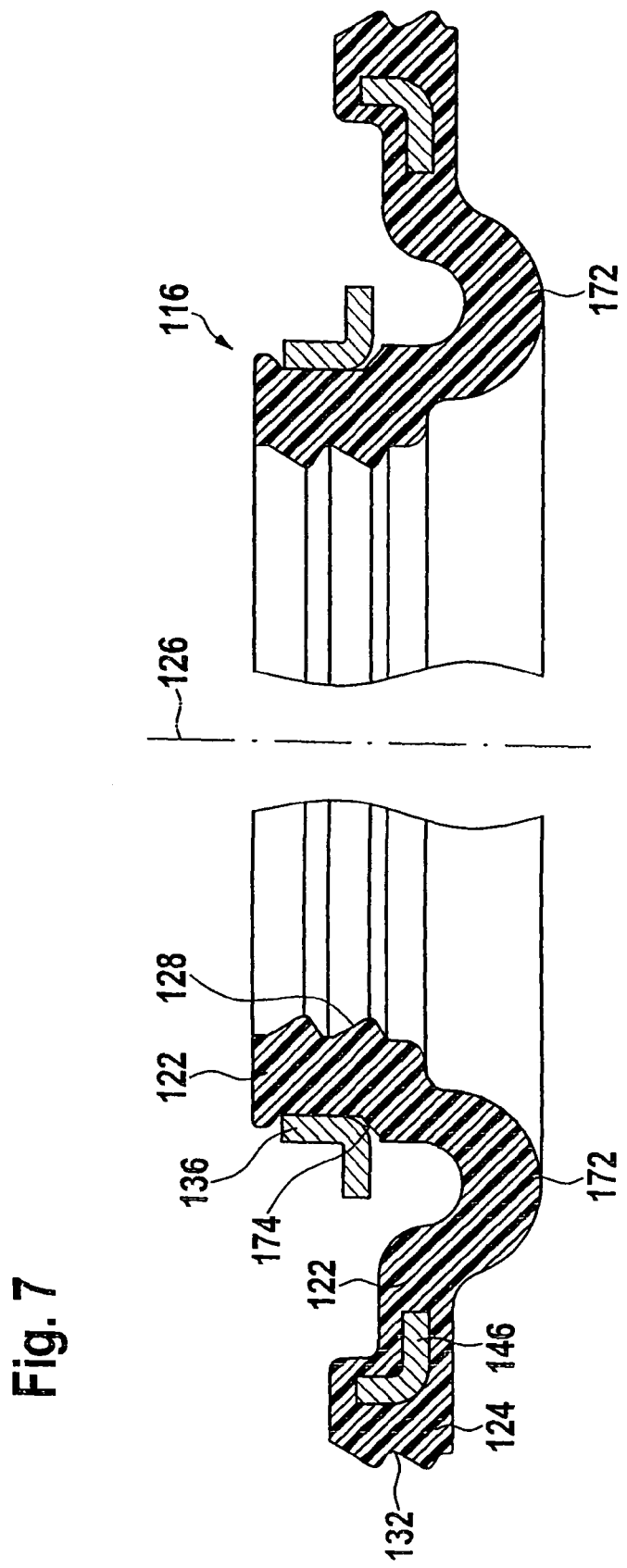
FIG. 7 shows a schematic vertical section through a second embodiment of a radial seal, which comprises a deformable compensation region for compensating radial and/or axial tolerances.

A second embodiment shown in FIG. 7 of a radial seal 116 differs from the first embodiment described above in that the sealing body 118 of the second embodiment comprises, in addition to the inner portion 122 with the inner sealing face 128 and the outer portion 124 with the outer sealing face 132, a compensation region 172 which connects the inner portion 122 to the outer portion 124 and which can be deformed in the radial direction and in the axial direction, i.e. transversely and parallel to the ring axis 126, in such a way that the inner sealing face 128 and the first reinforcement element 136, on the one hand, and the other sealing face 132 and the second reinforcement element 146, on the other hand, can be displaced relative to one another, both in the radial direction and in the axial direction, to a greater extent than in the first embodiment, in order to compensate radial or axial misalignment tolerances of, for example, up to +/−3 mm between the first component 102 and the second component 106.

The compensation region 172 may, in particular, as shown in FIG. 7, have a substantially U-shaped cross-section.

A shoulder 174 is configured at the transition between the compensation region 172 and the inner portion 122 of the sealing body 118 and downwardly limits the axial displacement path of the first reinforcement element 136 relative to the sealing body 118.

Moreover, the second embodiment shown in FIG. 7, of a radial seal 116 accords with the first embodiment shown in FIG. 2 to 6, to the above description of which reference is made in this respect.

The invention claimed is:

1. Radial seal for sealing between a first component arranged radially inside the radial seal and a second component arranged radially outside the radial seal, comprising a sealing body formed from a plastics material having a first, radially inner sealing portion having an inner sealing face for application to the first component and an outer face, and having a second, radially outer sealing portion having an outer sealing face for application to the second component, wherein the inner sealing face and the outer sealing face both are non-rotationally symmetrical relative to a ring axis of the seal for sealing a non-rotationally symmetrical contact face of the first component and the second component, respectively, a first reinforcement element, which supports the inner sealing face against a pressing force acting radially outwardly, and a second reinforcement element, which supports the outer sealing face against a pressing force acting radially inwardly;

wherein the first reinforcement element is placed on the outer face of the first, radially inner sealing portion and the second reinforcement element is embedded in the second, radially outer sealing portion, and wherein both the first reinforcement element and the second reinforcement element each have a non-rotationally symmetrical shape, wherein both the first reinforcement element and the second reinforcement element each have an angular cross-section and wherein both the first reinforcement element and the second reinforcement element each have at least one portion oriented substantially in a radial direction of the radial seal and at least one portion oriented substantially in an axial direction of the radial seal, wherein said at least one portion oriented substantially in a radial direction of the radial seal extends from said at least one portion oriented substantially in an axial direction of the radial seal in a radial direction of the radial seal.

2. Radial seal according to claim 1, wherein the ratio of the length of the sealing body to the width of the sealing body is at least 1.2:1.

3. Radial seal according to claim 1, wherein the sealing body has a substantially oval shape in plan view.

4. Radial seal according to claim 1, wherein at least one of the first reinforcement element and the second reinforcement element is configured in an annularly closed manner.

5. Radial seal according to claim 1, wherein at least one of the first reinforcement element and the second reinforcement element has a shape adapted to the form of a peripheral face of the first component.

6. Radial seal according to claim 1, wherein at least one of the first reinforcement element and the second reinforcement element is at least partially embedded in the sealing body.

7. Radial seal according to claim 1, wherein at least one of the first reinforcement element and the second reinforcement element is formed from a metallic material.

8. Radial seal according to claim 1, wherein the first reinforcement element and the second reinforcement element are arranged offset with respect to one another in an axial direction of the radial seal.

9. Radial seal according to claim 1, wherein the first reinforcement element and the second reinforcement element are movable relative to one another in at least one of an axial direction and a radial direction of the radial seal.

10. Radial seal according to claim 1, wherein at least one of the first reinforcement element and the second reinforcement element has at least one portion oriented substantially in an axial direction of the radial seal.

11. Radial seal according to claim 1, wherein the sealing body is formed from an ethylene-acrylate rubber or from a fluoro-rubber.

12. Radial seal according to claim 1, wherein the sealing body comprises a compensation region, which can be deformed in at least one of a radial direction and an axial direction of the sealing body.

13. Radial seal according to claim 12, wherein the compensation region has a substantially U-shaped cross-section.

14. Radial seal according to claim 2, wherein the ratio of the length of the sealing body to the width of the sealing body is at least 1.5:1.

15. Radial seal according to claim 1, wherein the sealing body is formed from an elastomeric plastics material.

16. Radial seal according to claim 1, wherein at least one of the first reinforcement element and the second reinforcement element is slidingly displaceable relative to the sealing body.

* * * * *